Patented July 7, 1925.

1,545,335

UNITED STATES PATENT OFFICE.

AUGUST LEOPOLD LASKA AND ARTHUR ZITSCHER, OF OFFENBACH-ON-THE-MAIN, GERMANY, ASSIGNORS TO CORPORATION OF CHEMISCHE FABRIK GRIESHEIM-ELEKTRON, OF FRANKFORT-ON-THE-MAIN, GERMANY.

MONOAZO DYES AND PROCESS OF MAKING SAME.

No Drawing.   Application filed September 11, 1922.   Serial No. 587,571.

*To all whom it may concern:*

Be it known that we, AUGUST LEOPOLD LASKA and ARTHUR ZITSCHER, citizens of the German Republic, and residents of Offenbach-on-the-Main, have invented certain new and useful Improvements in Monoazo Dyes and Processes of Making Same; and we do hereby declare the following to be a full, clear, and exact description of the invention, such as will enable others skilled in the art to which it appertains to make and use the same.

We have found, that especially valuable dyestuffs are obtained by combining the diazo compound of 5-nitro-2-toluidin with a para-alkyloxyarylid of 2.3 hydroxynaphthoic acid. With these products as well lakes, especially fast to light as bluish red shades on the fibre are obtained, which can be used in light colors as a pink of an excellent beauty and fastness.

The invention is illustrated by the following examples:

Example 1.

Into a diazo solution, prepared in the usual manner from 15.2 parts of 5-nitro-ortho-toluidin ($CH_3NH_2 : NO_2 = 1:2:5$), 30.7 parts of para-anisidid of 2.3-hydroxynaphthoic acid are while well stirring slowly poured, dissolved in diluted caustic soda solution, prepared from 29.2 parts of solution of 35° Bé. and to which is added turkey red oil and a quantity of sodium acetate corresponding to the surplus of acid in the diazo solution.

The dyestuff separates in red flakes, it is filtered, when the reaction is completed, washed until neutral reaction and advantageously used in the form of a paste.

When dry it forms a red powder, dissolving in concentrated sulfuric acid to a dark bluish red solution.

The color lake, prepared therefrom according to one of the usual methods, is distinguished by an excellent fastness to light.

*Example 2.—Production of the dyestuffs on the fiber.*

The yarn, which is well boiled with soda or caustic soda is impregnated with a warm solution of para-anisidid of 2.3-hydroxynaphthoic acid, well wrung out and then without drying developed in a diazo solution of 5-nitro-ortho-toluidin.

Padding solution.

Para-anisidid of the 2.3-hydroxynaphthoic acid, for pink, 2 gr.; for red, 40 gr.; caustic soda solution of 34° Bé., for pink, 5 cc.; for red, 100 cc.; turkey red oil, for pink, 50 cc.; for red, 120 cc.; formaldehyde of 30 p. c., for pink, 2 cc.; for red, 45 cc.; made up to, for pink, 10 liters; for red, 10 liters.

The para-anisidid of 2.3-hydroxynaphthoic acid is stirred with the caustic soda solution and the turkey red oil, then dissolved in boiling water, made up with cold water to the mentioned quantity and to the warm solution of about 30° C. the formaldehyde is added.

Diazosolution.

300 gr. of 5-nitro-ortho-toluidin are dissolved in 600 cc. of hydrochloric acid of 20° Bé. and 1000 cc. of water by boiling. Then while stirring continuously 1000 gr. of ice and 2000 cc. of cold water are added, whereon the base is separating.

Into this suspension a solution of 150 gr. of sodium nitrite in 300 cc. of water is slowly poured and made up, after the diazotization is completed, to 10 liters.

Dye baths of the diazo solution above mentioned, for pink, 70 cc.; for red, 1 liter, are mixed with, for pink, 10 liters; for red, 9 liters, of cold water and there is added to before dyeing, for pink, 10 cc.; for red, 160 cc., of a solution of sodium acetate (1:1).

The padded yarns are handled for a short time in the dyeing baths, wrung out, well rinsed with cold water and soaped, when boiling.

So clear bluish pink or red shades of an excellent brightness and fastness to light are obtained.

The formula of the dye is probably

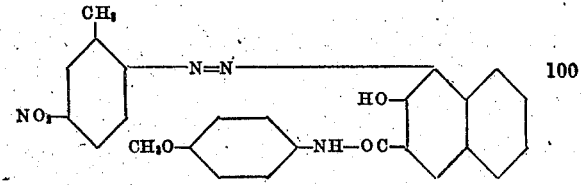

which when dry is a red powder, insoluble in water and soluble in sulphuric acid to a bluish red solution, of an excellent fastness to light, and when produced on the fibre having fast bluish-red shades; yielding on reduction with stannous chlorides 2.5-di-amino-toluene and para-methoxyl-anilid of 1 amino-2 hydroxy-3-naphthoic acid.

With other para-alkyloxyarylids, for example with para-phenetidid of 2.3-hydroxy-naphthoic acid, the process can be carried out in the same manner, giving dyes of probably the general formula

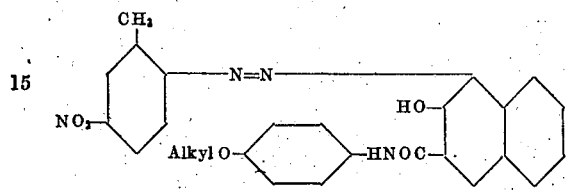

and are, when dry, red powders, insoluble in water and soluble in sulphuric acid, yielding lakes fast to light and when produced on the fibre, fast bluish-red shades, yielding on reduction with stannous chloride 2.5 di-amino-toluene and a para-alkyl-oxy-amid of 1-amino-2 hydroxy-3-naphthoic acid.

We claim:

1. As new products the monoazo dyes, which are obtained by combining the diazo compound of 5-nitro-ortho-toluidin ($CH_3:NH_2:NO_2=1:2:5$) with a para-alkyloxyarylid of 2.3-hydroxynaphthoic acid, having probably the general formula:

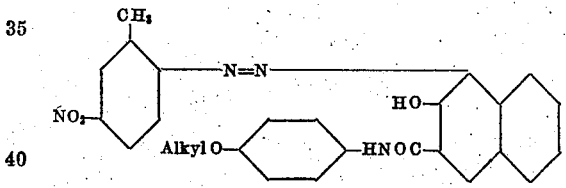

which are, when dry, red powders, insoluble in water and soluble in sulfuric acid to a bluish red solution, yielding lakes of an excellent fastness to light and, when produced on the fiber, excellently beautiful and fast bluish-red shades, yielding on reduction with stannous chloride 2.5-diamino-toluene and a para-alkyloxyanilid of 1-amino-2-hydroxy-3-naphthoic acid.

2. A process of making monoazo dyes, consisting in combining the diazo compound of 5-nitro-ortho-toluidin ($CH_3:NH_2:NO_2=1:2:5$) with a para-alkyloxyarylid of 2.3-hydroxynaphthoic acid.

3. A process for producing monoazo dyes on the fiber, consisting in impregnating the fiber with a para-alkyloxyarylid of 2.3-hydroxynaphthoic acid and developing with the diazo compound of 5-nitro-ortho-toluidin ($CH_3:NH_2:NO_2=1:2:5$).

4. As a new product the monoazo dyestuff, which is obtained by combining the diazo compound of 5-nitro-ortho-toluidin ($CH_3:NH_2:NO_2=1:2:5$) with para-anisidid of 2.3-hydroxynaphthoic acid, having probably the formula:

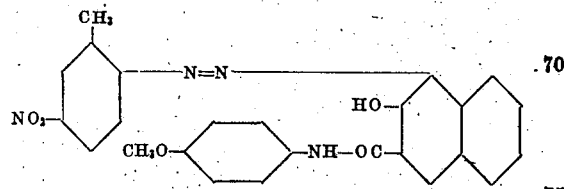

which is when dry a red powder, insoluble in water and soluble in sulfuric acid to a bluish red solution, yielding lakes of an excellent fastness to light and, when produced on the fiber excellently beautiful and fast bluish red shades, yielding on reduction with stannous chloride 2.5-diaminotoluene and para-methoxy-anilid of 1-amino-2-hydroxy-3-naphthoic acid.

5. A process of making a monoazo dyestuff, consisting in combining the diazo compound of 5-nitro-ortho-toluidin ($CH_3:NH_2:NO_2=1:2:5$) with p-anisidid of 2.3-hydroxynaphthoic acid.

6. A process for producing a monoazo dyestuff on the fiber, consisting in impregnating the fiber with p-anisidid of 2.3-hydroxynaphthoic acid and developing with the diazo compound of 5-nitro-ortho-toluidin ($CH_3:NH_2:NO_2=1:2:5$).

In testimony that we claim the foregoing as our invention, we have signed our names.

AUGUST LEOPOLD LASKA.
ARTHUR ZITSCHER.

Witnesses:
T. H. ANDERSON,
BASIL E. LAVARD.